(12) United States Patent
Lim et al.

(10) Patent No.: US 10,242,075 B2
(45) Date of Patent: Mar. 26, 2019

(54) DATABASE APPARATUS, DATABASE MANAGEMENT METHOD PERFORMED IN DATABASE APPARATUS AND STORING THE SAME

(71) Applicant: LG CNS CO., LTD., Seoul (KR)

(72) Inventors: Ui Jin Lim, Seoul (KR); Sung Jun Jung, Seoul (KR); Jeong Min Ju, Seoul (KR)

(73) Assignee: LG CNS CO., LTD., Seoul (KR)

( * ) Notice: Subject to any disclaimer, the term of this patent is extended or adjusted under 35 U.S.C. 154(b) by 385 days.

(21) Appl. No.: 14/496,814

(22) Filed: Sep. 25, 2014

(65) Prior Publication Data

US 2016/0092460 A1    Mar. 31, 2016

(51) Int. Cl.
*G06F 17/30* (2006.01)

(52) U.S. Cl.
CPC .............. *G06F 17/3056* (2013.01)

(58) Field of Classification Search
USPC ........................................ 707/771
See application file for complete search history.

(56) References Cited

U.S. PATENT DOCUMENTS

| | | | | |
|---|---|---|---|---|
| 6,453,404 | B1* | 9/2002 | Bereznyi | G06F 12/023 |
| | | | | 711/119 |
| 2005/0278387 | A1* | 12/2005 | Kamada | G06F 17/30575 |
| 2011/0035372 | A1* | 2/2011 | Smith | G06F 12/0875 |
| | | | | 707/722 |
| 2012/0054440 | A1* | 3/2012 | Doig | G06F 17/30902 |
| | | | | 711/122 |
| 2012/0110656 | A1* | 5/2012 | Santos | H04L 63/0263 |
| | | | | 726/13 |
| 2012/0124094 | A1* | 5/2012 | Olivieri | G06F 17/30902 |
| | | | | 707/792 |
| 2013/0185504 | A1* | 7/2013 | Ash | G06F 12/128 |
| | | | | 711/114 |

* cited by examiner

*Primary Examiner* — James Trujillo
*Assistant Examiner* — Jessica N Le
(74) *Attorney, Agent, or Firm* — KED & Associates, LLP (57) ABSTRACT

A database apparatus may include a database unit configured to store first and second data groups being classified based on a data attribute, a first caching unit associated with the first data group and including a first cache architecture and a second caching unit associated with the second data group and including a second cache architecture.

12 Claims, 3 Drawing Sheets

FIG. 1

| Key | cv | ci | v | uc | av |
|---|---|---|---|---|---|
| 01^SQL \| D0001^SA \| D0001^MACADDR0001^movie | hash_map<br>{C0001, 1}<br>{01^SA \| D0001^P0001, 2}<br>{01^SA \| D0001^P0002, 2} | qryResultObject[ ]<br>{"Keyoun-chul KIM", 24, "Movie Like"}<br>{"Sun-yi KIM", 34, "Movie Tour"} | | 10021 | 1 |
| 01^SA \| D0001^P0001 | | | 2 | | |
| 01^SA \| D0001^P0002 | | | 3 | | |

FIG. 2

| Key | Value (HashMap Type) ||||||
|---|---|---|---|---|---|---|
| | C0001 | ci | uc | av | om | omd |
| D^SQL \| D0001^movie^1034 | 4 | qryResultObject[ ]<br>{""Movie Like", "TVN"}<br>{"Movie Tour", "SBS"} | 10021 | 1 | 1 | 2014/06/01<br>12:23:45.0001212 |

| Key | Value (Numberic Type) |
|---|---|
| V^C0001 | 5 |

DATABASE APPARATUS, DATABASE MANAGEMENT METHOD PERFORMED IN DATABASE APPARATUS AND STORING THE SAME

BACKGROUND

1. Field

Embodiments may relate to a database apparatus technology and more particularly to a database apparatus, a database management method classifying data based on a data attribute to store the classified data in a cache having a different architecture from each other.

2. Background

A caching service may temporarily store data where a search work is complicated to transmit the data without a database fetch from a network application server. The caching service may transmit the data temporarily stored so that a load and a response time of the database may be decreased.

Korean Patent Registration No. 10-0496159 relates to a method for managing a query result cache based on usability, and may be provided to improve a performance for processing a query by calculating usability of the query results for the latest recently used queries and storing/deleting/replacing the query results based on the usability.

Korean Patent Publication No. 10-2004-085057 relates to invalidating database results and parsed objects generated from a database query, and may be provided to reduce load of the database for actually similar information, increase scalability, and guarantee data consistency by storing a result such as raw data generated from the database query, an object and a queryable data set to invalid a stored result when a database variation is generated or an expiration period elapses. The database variation effects a consistency of the stored result.

SUMMARY

Embodiments may provide a database apparatus capable of preventing a generation of a load for read and write through classifying and storing data based on a data attribute.

Embodiments may provide a database apparatus capable of storing data to a cache having an architecture suitable of a data attribute by classifying based on a data attribute.

Embodiments may provide a database apparatus capable of classifying a data attribute based on a data transaction and a data size.

Embodiments may provide a database apparatus capable of matching a version of a query result stored in a cache and a current version by managing a version for a query to synchronize the query result.

In at least one embodiment, a database apparatus may include a database unit configured to store first and second data groups classified based on a data attribute, a first caching unit associated with the first data group and including a first cache architecture and a second caching unit associated with the second data group and including a second cache architecture.

In at least one embodiment, an average data size of the first data group may be equal to or less than that of the second data group, and an average transaction frequency of the first data group may be equal to or more than that of the second data group.

In at least one embodiment, the database apparatus may further include a control unit configured to analyze a database query received from an user to transmit the analyzed database query to the database unit, the first caching unit or the second caching unit.

In at least one embodiment, the control unit may analyze a query predicate of the database query to transmit the analyzed database query to the first caching unit when a corresponding table is associated with the first data group.

In at least one embodiment, the first caching unit may interpret the transmitted database query to search a cache mapping table and may check effectiveness of a query result for the transmitted database query when the interpreted database query is searched in the cache mapping table.

In at least one embodiment, the first caching unit may generate a first cache key based on a query identifier and the query predicate of the database query to search the generated cache key in the cache mapping table.

In at least one embodiment, the first caching unit may check a version of the query result when the interpreted database query is searched in the cache mapping table to provide the query result when the checked version corresponds to a latest version.

In at least one embodiment, the first caching unit may check the version of the query result when the interpreted database query is searched in the cache mapping table to fetch the query result from the database unit when the checked version does not correspond to a latest version.

In at least one embodiment, the first caching unit may update the cache mapping table based on the generated cache key and the query result fetched from the database unit.

In at least one embodiment, the first caching unit may input the query result for the interpreted database query through the database unit when the interpreted database query is not searched in the cache mapping table.

In at least one embodiment, the control unit may analyze the query predicate of the database query to transmit the analyzed database query to the second caching unit when the corresponding cache mapping table is associated with the second data group, and the second caching unit may include a master caching unit and a plurality of slave caching units.

In at least one embodiment, the second caching unit may transmit the analyzed database query to a slave caching unit associated with the analyzed query predicate of the plurality of the slave caching units.

In at least one embodiment, the second caching unit may interpret the database query transmitted to the slave caching unit to determine a second cache key corresponding to the database query and to check effectiveness of the query result associated with the second cache key.

In at least one embodiment, the second caching unit may check the version of the query result of values associated with the second cache key to provide the query result when the checked version corresponds to the latest version.

In at least one embodiment, the second caching unit may check the version of the query result of the values associated with the second cache key to fetch the query result to the master caching unit from the database unit through the received database query when the checked version does not correspond to the latest version.

In at least one embodiment, the second caching unit may receive the query result for the interpreted database query through the database unit when the values associated with the second cache key are not searched.

In at least one embodiment, the control unit may analyze the query predicate of the database query to transmit the analyzed database query to the database unit when the corresponding table is associated with the database unit.

In at least one embodiment, the database unit may interpret the transmitted database query to perform at least one of inputting, updating or deleting data of the database unit.

In at least one embodiment, a database management method may be performed in the database apparatus. The database management method may include (a) receiving a database query from a user, (b) analyzing the database query, and (c) providing a query result to a database unit, a first caching unit or a second caching unit based on the analyzed database query.

In at least one embodiment, a machine-readable non-transitory medium storing a computer program for a database management method being performed in a database apparatus, the machine-readable non-transitory having stored thereon machine-executable instructions for receiving a database query from a user, analyzing the database query and providing a query result to a database unit, a first caching unit or a second caching unit based on the analyzed database query.

Embodiments may prevent a generation of a load for read and write through classifying and storing data based on a data attribute.

Embodiments may store data to cache having an architecture suitable of a data attribute by classifying based on a data attribute.

Embodiments may classify a data attribute based on a data transaction and a data size.

Embodiments may match a version of a query result being stored in a cache and a current version by managing a version for a query to synchronize the query result.

BRIEF DESCRIPTION OF THE DRAWINGS

Arrangement and embodiments may be described in detail with reference to the following drawings in which like reference numerals refer to like elements and wherein.

DETAILED DESCRIPTION

The following explanation is merely an embodiment for structural or functional explanation, so the scope of embodiments should not be construed to be limited to the disclosed embodiments. That is, since embodiments may be implemented in several forms without departing from the characteristics thereof, it should also be understood that the described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

While terms such as "first" and "second," etc., may be used to describe various components, such components must not be understood as being limited to the above terms. The above terms may be used to distinguish one component from another. For example, a first component may be referred to as a second component without departing from the scope of rights of the embodiment, and likewise a second component may be referred to as a first component.

It may be understood that when an element is referred to as being "connected to" another element, it may be directly connected to the other element or intervening elements may also be present. In contrast, when an element is referred to as being "directly connected to" another element, no intervening elements are present. In addition, unless explicitly described to the contrary, the word "comprise" and variations such as "comprises" or "comprising" may be understood to imply the inclusion of stated elements but not the exclusion of any other elements. Meanwhile, other expressions describing relationships between components such as "between", "immediately between" or "adjacent to" and "directly adjacent to" may be construed similarly.

Singular forms "a", "an" and "the" in the present disclosure are intended to include plural forms as well, unless the context clearly indicates otherwise. It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Identification letters (e.g., a, b, c, etc.) in respective steps or operations may be used for the sake of explanation and do not describe any particular order. The respective operations may be changed from a mentioned order unless specifically mentioned in context. Respective steps or operations may be performed in the same order as described, may be substantially simultaneously performed, and/or may be performed in reverse order.

Embodiments may be implemented as machine-readable codes on a machine-readable medium. The machine-readable medium may include any type of recording device for storing machine-readable data. Examples of the machine-readable recording medium may include a read-only memory (ROM), a random access memory (RAM), a compact disk-read only memory (CD-ROM), a magnetic tape, a floppy disk, and/or optical data storage. The medium may also be carrier waves (e.g., Internet transmission). The computer-readable recording medium may be distributed among networked machine systems that store and execute machine-readable codes in a de-centralized manner.

The terms used in the present disclosure are merely used to describe particular embodiments, and are not intended to limit the scope. Unless otherwise defined, all terms used herein, including technical or scientific terms, have the same meanings as those generally understood by those with ordinary knowledge in the field of art to which the embodiment belongs. Such terms as those defined in a generally used dictionary may be interpreted to have meanings equal to the contextual meanings in the relevant field of art, and are not to be interpreted to have ideal or excessively formal meanings unless clearly defined in the present application.

Figure 1:
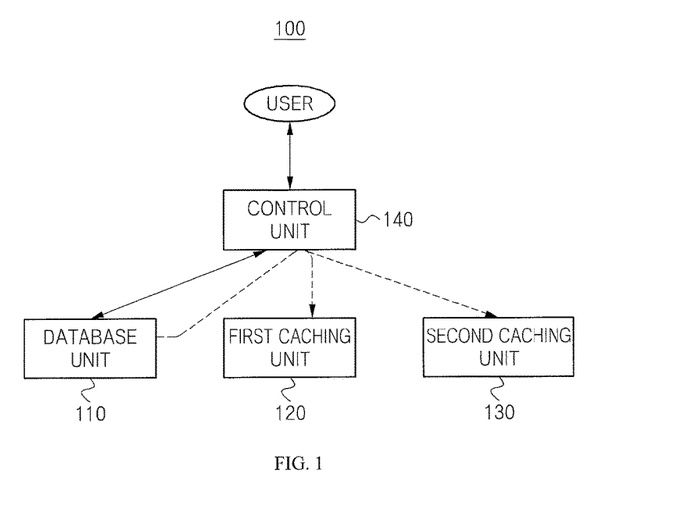
FIG. 1 is a block diagram of a database apparatus.

FIG. 1 is a block diagram of a database apparatus. Other embodiments and configurations may also be provided.

Referring to FIG. 1, a database apparatus 100 may include a database unit 110, a first caching unit 120, a second caching unit 130 and a control unit 140. The database unit 110 may be connected with the control unit 140 and the first and second caching units 120, 130 may be connected with the database unit 110 through the control unit 140.

The database unit 110 may store first and second data groups classified based on a data attribute. An average data size of the first data group may be equal to or less than that of the second data group, and an average transaction frequency of the first data group may be equal to or more than an average transaction frequency of the second data group. For example, in a service providing a content to an user through a TV, the first data group may correspond to a content list, a broadcast schedule or a product, and the second data group may correspond to a favorites list or a customer offer as personalized information. An example embodiment may limit a service providing a content to a user through a TV. This limitation may be used for convenience's sake and should not be intended to limit the scope of embodiments.

In at least one embodiment, the database unit 110 may include other information as well as first and second data groups. For example, client information, common information or personalized information may be included. The client information may correspond to information for a subscriber, a device or a subscription product. The common information may correspond to a content list, a category album, a title or a poster. The personalized information may correspond to a favorite, a NSC product, a custom offer or a buy. The client information, the common information or the personalized information may correspond to first data or second data by a data attribute of each other.

The first caching unit 120 may be associated with the first data group, and the first caching unit 120 may have a first cache architecture.

Figure 2:
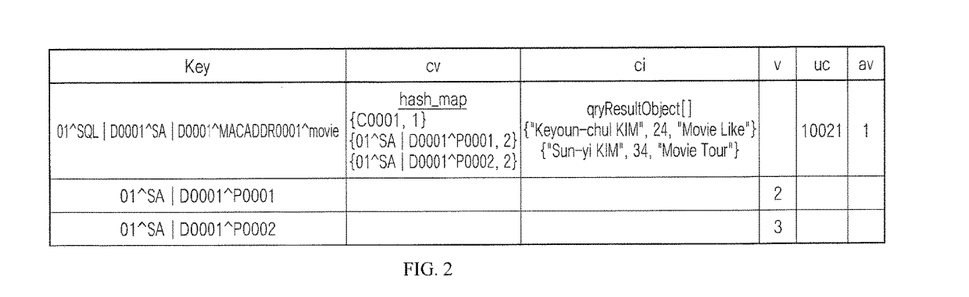
FIG. 2 is a table showing a first data group stored in a first caching unit having a first cache architecture.

Referring to FIG. 2, for example, the first cache architecture may correspond to the first data group stored in the first caching unit 120. The first cache architecture may be stored by a table type. In the table, the key may correspond to a first cache key for accessing to a specific table, cv may correspond to a cache version as a hash map, ci may correspond to cache information, uc may correspond to a reuse number and tav may correspond to whether the cache is available.

For example, a database query for obtaining a query result of FIG. 2 may correspond to the following [Query 1] and the query result may correspond to the following [Table 1].

[Query 1]
SELECT C.NAME, C.AGE, F.FAVORITE_CH
FROM TB_CUSTOMER C, TB_FAVORITE F, TB_CHANEL G
WHERE C.SA_ID=F.SA_ID
AND F.CHANEL_ID=G.,CHANEL_ID
AND G.GUBUN=V_GUBUN—'movie'
AND C.MAC_ADDR=V_MAC_ADDR—'MACADDR0001'
AND C.SA_ID=V_SA_ID—'SAID0001'

TABLE 1

| NAME | AGE | FAVORITE_CH |
|---|---|---|
| Keyung-chul KIM | 24 | Movie Like |
| Sun-yi KIM | 34 | Movie Tour |

When the query result is stored as the first cache architecture, '01^SQLID0001^SAID0001^MACADDR0001^movie' corresponding to the first cache key performing an identifier function representing a corresponding query result may be stored in the key and values of the cv, ci, v, uc and av may also be stored in the table. The cv value may be stored as a pair of an identification key and a version. For example, {C0001, 1} may represent that the version of C0001 is 1 and {01^SAID0001^P0001,2} may represent that the version of 01^SAID0001^P0001 is 2. The ci value may be stored by object[ ] type, for example, {"Keyung-chul KIM", 24, "Movie Like"} may represent that a client name is Keyung-chul KIM, a client age is 24 and a favorite channel is "Movie Like". The av may represent whether the cache is available, for example, 0 may correspond to the cache not being available, and 1 may correspond to the cache being available.

Figure 3:
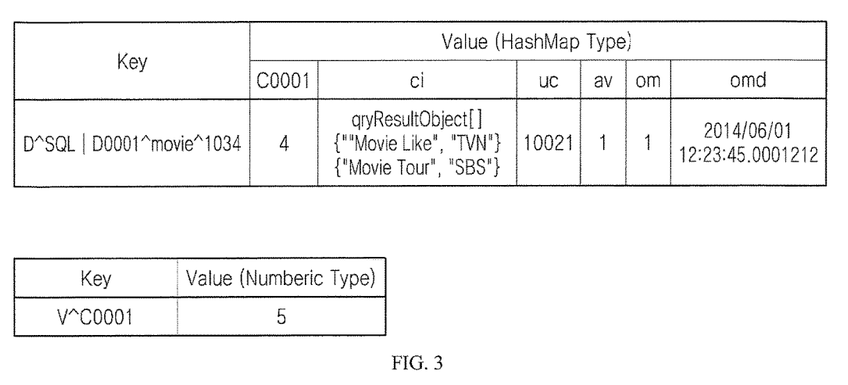
FIG. 3 is a table showing a second data group stored in a second caching unit having a second cache architecture.

The second caching unit 130 may be associated with the second data group and the second caching unit 130 may have a second cache architecture.

Referring to FIG. 3, for example, the second cache architecture corresponds to the second data group being stored in the second caching unit 130 (having the second cache architecture). The second cache architecture may be stored by a key-value type. The second key architecture may be illustrated by the table type for convenience's sake. That is, C0001, ci, uc, av, om and omd of FIG. 3 may not actually correspond to the key or the value but may semantically correspond to a component of each of the first cache architecture. Therefore, the second cache architecture may not be used for key accessing the C0001, ci, uc, av, om and omd to the corresponding value. In other words, "4", "{"Movie Like", "TVN"}, {"Movie Tour","SBS"}", "10021", "1", "1" and "2014/06/01 12:23:45.0001212" may be stored as the key_value corresponding to D^SQLID0001^Movie^1034. The C0001 may correspond to the cache version, for example, may correspond to a serial number of the second caching unit 130. The om may represent whether the cache is generated, 0 may represent that the generation is completed, 1 may represent that the generation is progressed and 2 may represent a dummy. The omd may correspond to re-generating the cache when a next work is not changed after a certain time for preparing a failure of performing a thread. The others may be same as the first cache architecture.

For example, the database query for obtaining the query result of FIG. 3 may correspond to the following [Query 2] and the query result may correspond to the following [Table 2].

[Query 2]
SELECT G.CH_NAME, G.CH_COMPANY
FROM TB_CHANEL G
WHERE 1=1
AND G.GUBU=V_GUBUN—'movie'
AND G.CH_ID=V_CH_ID—'1034'

TABLE 2

| CH_NAME | CH_COMPONY |
|---|---|
| Movie Like | TVN |
| Movie Tour | SBS |

When the query result is stored as the second cache architecture, the query result may be represented as FIG. 3. The second cache key performing the identifier function may be 'D^SQLID0001^movie^1034' and the key_value associated with the corresponding key may correspond to '4', '{"Movie Like", "TVN"}, {"Movie Tour", "SBS"}', '100021', '1', '1' and '2014/06/01 12:23:45.0001212'.

The first and second caching units 120, 130 may copy partial data of a database to temporarily store. The first caching unit 120 may temporarily store the first data group, and the second caching unit 130 may temporarily store the second data group.

The control unit 140 may receive and analyze the database query from the user to transmit a corresponding database query to the database unit 110, the first caching unit 120 or the second caching unit 130.

In at least one embodiment, the control unit 140 may analyze a query predicate of the database query received from a user to transmit the analyzed database query to the first caching unit 120 when the corresponding table is associated with the first data group.

A database query management method being performed on the first caching unit 120 receiving the database query from the control unit 140 may be described.

In at least one embodiment, the first caching unit 120 may interpret the transmitted database query to search a cache mapping table and may check (or determine) effectiveness of the transmitted database query when the interpreted database query is searched in the cache mapping table. The cache mapping table may be a table associated with the query result of the corresponding database query based on the database query and may correspond to at least one. The effectiveness of the query result may check (or determine) whether the corresponding query result corresponds to a query result being intended by the user, that is, whether the corresponding result corresponds to an effective query result and the effectiveness may be checked (or determined) through comparing a version of the query result.

In at least one embodiment, the first caching unit 120 may generate the first cache key based on a query identifier and the query predicate of the database query to search the first cache key generated from the cache mapping table. For example, referring to [Query 1], '01^SQLID0001^SAID0001^MACADDR0001^movie' corresponding to the key of FIG. 2 may be generated as the first cache key based on the query identifier separately assigned by each query and the query predicate of the WHERE clause in SQL of [Query 1]. After generating the first cache key, the first caching unit 120 may search the first cache key in the cache mapping table.

In at least one embodiment, the first caching unit 120 may check (or determine) the version of the query result when the interpreted database query is searched (i.e., when the first cache key is searched in the cache mapping table). The version of the query result may correspond to a specific identifier assigned to the database query when the first caching unit 120 fetches (or obtains) the corresponding query result from the database unit 110. For example, when the database query is a query searching {'name', 'age'}, the corresponding query may assign 'version 1', and when the database query is a query searching {'name', 'gender'}, the corresponding query may assign 'version 2'. In at least one embodiment, the version of the query result may be managed through the database unit 110, but may not be modified or changed through the first caching unit 120 or the second caching unit 130. The version of the query result may check (or determine) whether the query result being managed in the first caching unit 120 or the second caching unit 130 is matched with a current query result being managed in the database unit 110 by comparing the version of the query result.

Referring to FIG. 2, for example, the version of the query result may be compared by comparing a version being stored as a hash map of the cv and a current version being stored in the v and differencing of version of 01^SAID0001^P0002 may be showed in FIG. 2.

In at least one embodiment, when the version of the query result corresponds to a latest version, the first caching unit 120 may provide the corresponding query result. Corresponding to the latest version may represent a match of the current version and the version of the query result being stored in the first caching unit 120. Referring to FIG. 2, for example, 01^SAID0001^P0001 may correspond to the latest version because the version of the query result stored in the first caching unit 120 may be the same as 2.

In at least another embodiment, when the version of the query result does not correspond to the latest version, the first caching unit 120 may fetch (or obtain) the query result from the database unit 110 through the received database query. Herein, not corresponding to the latest version may correspond to differencing between the version of the query result corresponding to the database query and the version of the query result stored in the first caching unit 120, that is may represent a mismatch of the query result being intended by the user and the query result being stored in the first caching unit 120. The first caching unit 120 may fetch (or obtain) the query result corresponding to the database query from the database unit 110, and the first caching unit 120 may update the cache mapping table based on the generated first cache key and the query result fetched from the database unit 110.

In at least one embodiment, when the interpreted database query is searched in the cache mapping table, the first caching unit 120 may be inputted the query result through the database unit 110. When the database query is searched in the cache mapping table, the query result corresponding to the database query does not exist. In this case, the user may input the query result. For example, when the user inputs the database query for obtaining the query result corresponding to {'name', 'age'} but the corresponding query result does not exist, the user may directly input the query result corresponding to {'Gil-dong Hong', '30'} through the database unit 110.

In at least one embodiment, the control unit 140 may directly provide the query result inputted through the database unit 110 to the user in the database unit 110 or may update the cache mapping table based on the query result inputted through the database unit 110. That is, the query result inputted through the database unit 110 may be directly provided to the user or may be provided to the user through the first caching unit 120 after being updated in the first caching unit 120.

In at least one embodiment, the control unit 140 may analyze the query predicate of the database query to transmit the analyzed database query to the second caching unit 130 when the corresponding table is associated with the second data group.

Figure 4:
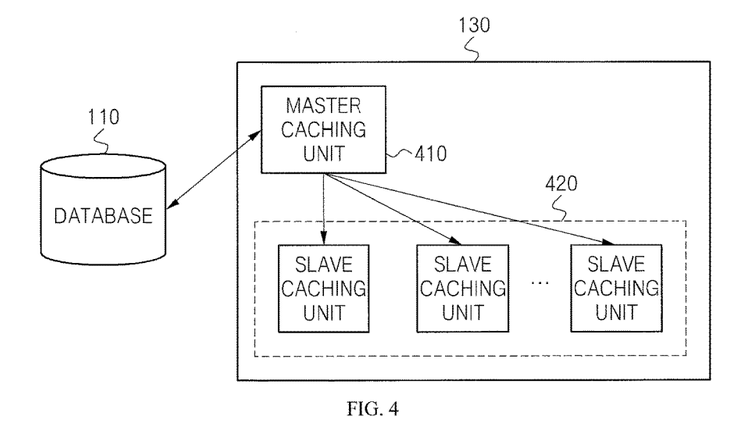
FIG. 4 is a diagram showing a second cache architecture of a second caching unit.

A database management method performed on the second caching unit 120 receiving the database query may now be described. Referring to FIG. 4, a characteristic for the second cache architecture of the second caching unit 130 may be described.

Referring to FIG. 4, the second caching unit 130 may include a master caching unit 410 and a plurality of slave caching units 420. The plurality of the slave caching units 420 may be generated by copying at least part or whole of the master caching unit 410, and the plurality of the slave caching units 420 may be synchronized with the master caching unit 410. More specifically, the second caching unit 130 may asynchronously provide the second data group to the master caching unit 410 of the second caching unit 130 through the database unit 110. The master caching unit 410 may copy a part or whole of the second data group in the mask caching unit 410 to synchronously provide to the plurality of the slave caching units 420. That is, the plurality of the slave caching units 420 may be synchronized with the master caching unit 410.

In at least one embodiment, the second caching unit 130 may transmit the analyzed database query to a slave caching unit associated with the analyzed query predicate of the plurality of the slave caching units 420. For example, if the slave caching unit is generated by copying a part of the second data group corresponding to a Seoul region, the second caching unit 130 may transmit the database query to the corresponding slave caching unit only when the analyzed query predicate is associated with the Seoul region. In at least another embodiment, if the slave caching unit is generated by copying the whole of the second data group of the master caching unit 410, the second caching unit 130 may transmit the analyzed database query to the slave caching unit randomly selected from the plurality of the slave caching units 420.

In one embodiment, the second caching unit 130 may interpret the database query transmitted to the slave caching unit to generate the second cache key corresponding to the database query. Referring to [Query 2], for example, 'D^SQLID0001^movie^1034' corresponding to the key in FIG. 3 may be generated as the second cache key based on the query identifier and the query predicate of the WHERE clause in SQL of [Query 2]. In at least one embodiment, the second caching unit 130 may search the second cache key in the second data group to check (or determine) effectiveness of the query result associated with the second cache key. More specifically, the second caching unit 130 may search the second cache key in the second data group being stored as the key_value type to check (or determine) whether the searched query result is effective only when the second cache key is searched and the effectiveness of the query result may be checked (or determined) comparing the version of the query result.

In at least one embodiment, the second caching unit 130 may check (or determine) the version of the query result of values associated with the second cache key. The version of the query result may be same with the above description in the first caching unit 120. The second caching unit 130 may compare a value corresponding to the version of the query result and the current version to check (or determine) the version of the query result, this is because data is managed as the key_value in the second caching unit 130.

Referring to FIG. 3, for example, the version of the query result being stored in the second caching unit 130 is '4' corresponding to a value of 'C0001' but the version of the current query result is '5' corresponding to a key_value of V^C0001'. In this example, the version of D^SQLID0001^movie^1034 may be different than the version of the current query.

In at least one embodiment, when the version of the query result corresponds to the latest version, and the second caching unit 130 may provide the corresponding query result. Corresponding to the latest version may represent that the current version matches the version of the query result stored in the second caching unit 130.

In at least another embodiment, when the version of the query result does not correspond to the latest version, the second caching unit 130 may fetch (or obtain) the query result to the master caching unit 410 of the second caching unit 130 through the database query from the database unit 110. Herein, not corresponding to the latest version may be the same with the above description for the first caching unit 130. The master caching unit 410 of the second caching unit 130 may fetch (or obtain) the query result corresponding to the database query. The master caching unit 410 may store the corresponding query result as a key_value of the second cache key. The slave caching unit may synchronize the corresponding query result with the second cache key updated in the master caching unit 410.

In at least one embodiment, when the values associated with the second cache key is not searched, the second caching unit 130 may input the query result for the database query interpreted through the database unit 110. When the second cache key generated through the database query is searched in the second caching unit 130, the query result corresponding to the database query does not exist. In this example, the user may input the query result through the database unit 110.

In at least one embodiment, the control unit 140 may directly provide the query result inputted through the database unit 110 to the user from the database unit 110 or may update the master caching unit 410 of the second caching unit 130 based on the query result inputted through the database unit 110 to synchronize a content for the updated query result to the master caching unit 410. That is, the query result inputted through the database unit 110 may be directly provided to the user or may be provided to the user through the slave caching unit after updating the master caching unit 410 and the slave caching unit.

In at least one embodiment, the control unit 140 may analyze the query predicate of the database query to transmit the analyzed database query to the database unit 110 when the corresponding table is associated with the database unit 110. The database query associated with the database unit 110 may correspond to an inputting, updating or deleting of the data.

In at least one embodiment, the database unit 110 may interpret the transmitted database query to perform at least one of inputting, updating and deleting the data. When the inputting, updating or deleting the data are generated through the database unit 110, the inputting, updating or deleting of data is not directly applied to the first caching unit 120 and the second caching unit 130 but receives the database query associated with the inputted, updated and deleted data through the database unit 110 to cause the inputted, updated and deleted data to be applied to the first caching unit 120 or the second caching unit 130 only when the corresponding database query is provided to the first caching unit 120 or the second caching unit 130. For example, if data A is updated to data A' and the data A is associated with the first data group, the control unit 140 may receive the database query for the data A' from the user and when the database query is provided to the first caching unit 120, the first caching unit 120 may receive the data A' updated for the data A to update with a content corresponding to the data A'. That is, when the database query for the data A' is received from the user, the first caching unit 120 may not update with the content corresponding to the data A'.

Figure 5:
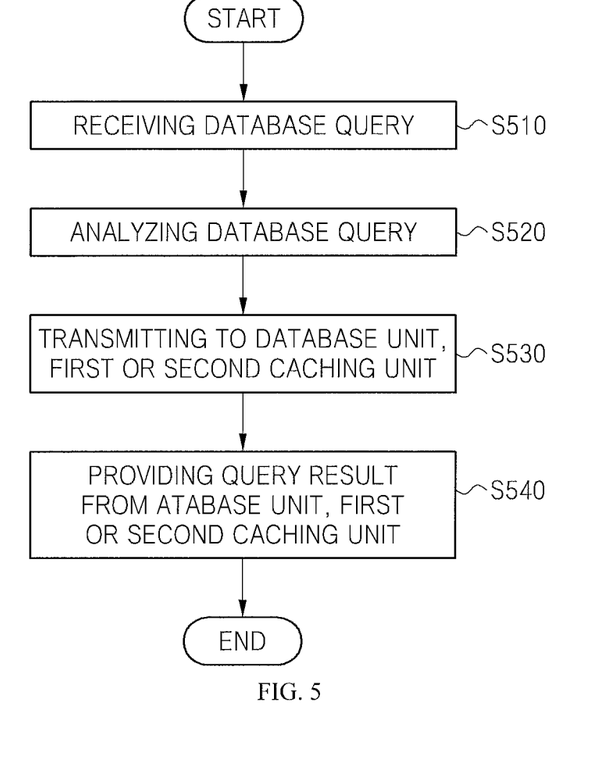
FIG. 5 is a flow chart showing a database management method performed in the database apparatus of FIG. 1.

FIG. 5 is a flow chart showing a database management method performed in the database apparatus of FIG. 1. Other operations, orders of operations and embodiments may also be provided.

The control unit 140 of the database apparatus 100 may receive a database query from the user (Operation S510) to analyze the database query (Operation S520). The database query may be analyzed based on the query predicate of WHERE clause in SQL.

The control unit 140 may transmit the database query to the database unit 110, the first caching unit 120 or the second caching unit 130 based on a result analyzing the query (Operation S530). More specifically, when the result analyzing the query corresponds to at least one of inputting, updating and deleting the data, the control unit 140 may transmit the result to the database unit 110, when the result is associated with the first caching unit 120 or when the result is associated with the first caching unit 120 and when the result is associated with the second caching unit 130 is associated with the second caching unit 130, the result may transmit to the second caching unit 130.

The control unit 140 may receive the query result from the database unit 110, the first caching unit 120 or the second caching unit 130 to provide to the user (Operation S540). More specifically, the control unit 140 may check (or determine) whether the query result exists in the first caching unit 120 or the second caching unit 130 and the version of the query result is matched with the current version based on the first or second cache key generated through analyzing and interpreting the database query to provide the query result in the database unit 110, the first caching unit 120 or the second caching unit 130. In at least one embodiment, when the query result does not exist, the control unit 140 may provide the query result by being directly received from the user through the database unit 110.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A database system comprising:
a database configured to store first and second data groups classified based on a data attribute;
a memory that includes a first cache and a second cache, the first cache being associated with the first data group, and including a first cache architecture, the second cache associated with the second data group, and including a second cache architecture;
a receiving device to receive a database query from a user; and
a control device separate from the database and the memory, wherein the first cache and the second cache are connected to the database through the control device, wherein the control device is a machine, the control device configured to:
receive, at the control device, the database query from the receiving device,
analyze, at the control device, the received database query, and
transmit, from the control device, a query result to the database, the first cache or the second cache, wherein the query result is based on the analyzed database query,
wherein the control device to analyze a query predicate of the database query and the control device to transmit the analyzed database query to the first cache when a corresponding table is associated with the first data group, wherein the control device to transmit the analyzed database query to the second cache when a corresponding table is associated with the second data group, wherein the control device to transmit the analyzed database query to the database when a corresponding table is associated with the database,
wherein the first cache to interpret the transmitted database query and to search a cache mapping table at the first cache to determine effectiveness of the query result for the database query when the interpreted database query is searched in the cache mapping table, wherein the cache mapping table at the first cache includes information of a version of a query result,
wherein the first cache to determine a version of the query result when the interpreted database query is searched in the cache mapping table, and the first cache to provide the query result when the determined version corresponds to a latest version,
wherein when the determined version does not correspond to a latest version, the first cache to determine the version of the query result when the interpreted database query is searched in the cache mapping table to obtain the query result from the database, and
wherein the first cache to update the cache mapping table at the first cache based on a cache key and the query result obtained from the database,
wherein when the interpreted database query is not searched in the cache mapping table, the first cache is to be inputted the query result by the user for the interpreted database query through the database, the query result inputted by the user through the database is directly provided to the user or is provided to the user through the first cache after being updated in the first cache.

2. The database system of claim 1, wherein an average data size of the first data group is equal to or more than an average data size of the second data group, and an average transaction frequency of the first data group is equal to or more than an average transaction frequency of the second data group.

3. The database system of claim 1, wherein the first cache to provide the cache key based on a query identifier and the query predicate of the database query to search the cache key in the cache mapping table.

4. The database a system of claim 1,
wherein the second cache includes a master cache and a plurality of slave caches.

5. The database system of claim 4, wherein the second cache to provide the analyzed database query to one of the plurality of slave caches based on the analyzed query predicate.

6. The database system of claim 5, wherein the second cache to interpret the database query provided to the slave cache to determine a cache key corresponding to the database query and to determine effectiveness of the query result associated with the cache key.

7. The database system of claim 6, wherein the second cache to determine a version of the query result of values associated with the cache key and to provide the query result when the determined version corresponds to a latest version.

8. The database system of claim 6, wherein the second cache to determine a version of the query result of the values associated with the cache key to obtain the query result to the master cache from the database through the received database query when the determined version does not correspond to the latest version.

9. The database system of claim 6, wherein the second cache to receive the query result for the interpreted database query through the database when the values associated with the cache key are not searched.

10. The database system of claim 1, wherein the database to interpret the database query to perform at least one of inputting, updating or deleting data.

11. A database management method to be performed at a database apparatus that includes a control device, the method comprising:
receiving, at the control device, a database query from a user;
analyzing, at the control device, the database query; and
providing, from the control device, a query result to a database unit, a first caching unit associated with a first data group or a second caching unit associated with a second data group based on the analyzed database query, wherein the query result is based on the analyzed database query, wherein a query predicate of the database query to be analyzed by the control device and the analyzed database query to be provided from the control device to the first caching unit when a corresponding table is associated with the first data group, wherein the analyzed database query to be provided from the control device to the second caching unit when a corresponding table is associated with the second data group, wherein the analyzed database query to be provided from the control device to the second caching unit when a corresponding table is associated with the database, wherein the first caching unit to interpret the database query and to search a cache mapping table at the first caching unit to determine effectiveness of the query result for the database query when the interpreted database query is searched in the cache mapping table, wherein the cache mapping table includes information of a version of a query result,
wherein the first caching unit to determine a version of the query result when the interpreted database query is searched in the cache mapping table, and the first caching unit to provide the query result when the determined version corresponds to a latest version,
wherein when the determined version does not correspond to a latest version, the first caching unit to determine the version of the query result when the interpreted database query is searched in the cache mapping table to obtain the query result from the database unit, and
wherein the first caching unit to update the cache mapping table at the first caching unit based on a cache key and the query result obtained from the database unit,
wherein when the interpreted database query is not searched in the cache mapping table, the first cache unit is to be inputted the query result by the user for the interpreted database query through the database unit, the query result inputted by the user through the database unit is directly provided to the user or is provided to the user through the first cache unit after being updated in the first cache unit.

12. A machine-readable non-transitory medium storing a computer program for a database management method to be performed in a database apparatus, the machine-readable non-transitory medium having stored thereon machine-executable instructions for:
receiving, at a control device, a database query from a user;
analyzing, at the control device, the database query; and
providing, from the control device, a query result to a database unit, a first caching unit associated with a first data group or a second caching unit associated with a second data group based on the analyzed database query, wherein the query result is based on the analyzed database query, wherein a query predicate of the database query to be analyzed by the control device and the analyzed database query to be provided from the control device to the first caching unit when a corresponding table is associated with the first data group, wherein the analyzed database query to be provided from the control device to the second caching unit when a corresponding table is associated with the second data group, wherein the analyzed database query to be provided from the control device to the second caching unit when a corresponding table is associated with the database, wherein the first caching unit to interpret the database query and to search a cache mapping table at the first caching unit to determine effectiveness of the query result for the database query when the interpreted database query is searched in the cache mapping table, wherein the cache mapping table includes information of a version of a query result,
wherein the first caching unit to determine a version of the query result when the interpreted database query is searched in the cache mapping table, and the first caching unit to provide the query result when the determined version corresponds to a latest version,
wherein when the determined version does not correspond to a latest version, the first caching unit to determine the version of the query result when the interpreted database query is searched in the cache mapping table to obtain the query result from the database unit, and
wherein the first caching unit to update the cache mapping table at the first caching unit based on a cache key and the query result obtained from the database unit,
wherein when the interpreted database query is not searched in the cache mapping table, the first cache unit is to be inputted the query result by the user for the interpreted database query through the database unit, the query result inputted by the user through the database unit is directly provided to the user or is provided to the user through the first cache unit after being updated in the first cache unit.

* * * * *